(12) United States Patent
Schmotter

(10) Patent No.: US 9,072,316 B2
(45) Date of Patent: *Jul. 7, 2015

(54) ALKALINE COMPOSITIONS

(71) Applicant: Richard Alexander Schmotter, San Francisco, CA (US)

(72) Inventor: Richard Alexander Schmotter, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/184,505

(22) Filed: Feb. 19, 2014

(65) Prior Publication Data

US 2014/0170261 A1      Jun. 19, 2014

Related U.S. Application Data

(63) Continuation of application No. 14/164,466, filed on Jan. 27, 2014.

(60) Provisional application No. 61/733,729, filed on Dec. 5, 2012.

(51) Int. Cl.
*A23L 2/56* (2006.01)
*A23L 2/52* (2006.01)

(52) U.S. Cl.
CPC .............. *A23L 2/52* (2013.01); *A23V 2002/00* (2013.01)

(58) Field of Classification Search
USPC .................. 426/2, 72, 590, 599, 615, 658
IPC ...... A23L 2/52,1/29; A23V 2002/00, 2250/161, A23V 2250/2102, 2250/708
See application file for complete search history.

(56) References Cited

U.S. PATENT DOCUMENTS

| | | | |
|---|---|---|---|
| 4,322,407 A * | 3/1982 | Ko ............................... | 424/601 |
| 4,551,342 A | 11/1985 | Nakel et al. | |
| 4,649,051 A * | 3/1987 | Gyllang et al. ................ | 424/686 |
| 5,114,723 A | 5/1992 | Stray-Gundersen | |
| 5,437,880 A * | 8/1995 | Takaichi et al. ................. | 426/73 |
| 6,261,610 B1 | 7/2001 | Sher et al. | |
| 6,703,056 B2 * | 3/2004 | Mehansho et al. .............. | 426/74 |
| 6,989,171 B2 | 1/2006 | Portman | |
| 2002/0055540 A1 | 5/2002 | Golini | |
| 2002/0187219 A1* | 12/2002 | Yang et al. ....................... | 426/72 |
| 2003/0059514 A1* | 3/2003 | Villagran et al. ............ | 426/590 |
| 2005/0043274 A1 | 2/2005 | Murad | |
| 2006/0127448 A1 | 6/2006 | Carlson et al. | |
| 2006/0286259 A1* | 12/2006 | Hargreaves .................... | 426/590 |
| 2007/0160683 A1 | 7/2007 | Johnson et al. | |
| 2007/0218170 A1 | 9/2007 | Kendrick | |
| 2008/0317924 A1 | 12/2008 | Yang | |
| 2009/0074936 A1 | 3/2009 | Schmidt et al. | |
| 2009/0104312 A1* | 4/2009 | Kamarei et al. ................. | 426/72 |
| 2011/0081455 A1 | 4/2011 | Kamarei et al. | |
| 2011/0135786 A1* | 6/2011 | Milici et al. ....................... | 426/2 |
| 2012/0077873 A1* | 3/2012 | Zachwieja et al. ............ | 514/456 |
| 2012/0207883 A1 | 8/2012 | Kim | |
| 2014/0199432 A1 | 7/2014 | Schmotter | |

FOREIGN PATENT DOCUMENTS

| KR | 2011116345 A | 10/2011 |
|---|---|---|
| WO | WO 2014/093999 | 6/2014 |

OTHER PUBLICATIONS

"Bolthouse Farms Juices" downloaded from www.bolthouse.com, dated Jul. 19, 2013, 1 page.*
Flavrz 'Superfruit Sports Revive', downloaded from www.flavrzdrinkmix.com, dated Aug. 10, 2011, 2 pages.*
"Venga Rehydrate" downloaded from internet archives www.drinkvenga.de/infusions/rehydrate/, dated Jul. 23, 2009, 6 pages.*
Mike Adams, "Natural News", downloaded from www.naturalnews.com, 9 pages, dated May 21, 2007.*
"Electro Aloe®", downloaded from www.bodywise.com/corporate/products/pdf, dated Oct. 15, 2008, 1 page.*
"Dipotassium phosphate" downloaded from www.weighttraining.com, 6 pages, dated Sep. 12, 2011.*
"Human Sports Performance" downloaded from www.humansportsperformance.com/HighGlycemicDrinks-NEW.htm, 5 pages, dated Apr. 26, 2009.*
Stacy Rebbert "Tasting the Future", downloaded from http://i95business.com/2011/08/tasting-the-future/, Aug. 2011, 3 pages.*
"Bolthouse Farms Protein Plus" downloaded from http://smellslikefoodinhere.blogspot.com/2011_07_01_archive.html, dated Jul. 31, 2011, 3 pages.*
Eric Uthus, "Coffee—A functional food with health benefits", 2006, USDA Research Service, 1 page.*
The New York Times, May 5, 2011, Protein in Diet Overview, 3 pages.*
Schmotter et al, pHenOH pH 7.4 The world's first alkaline, organic sports drink PowerPoint Presentation, presented May 2012.
PCT/US14/14715 International Search Report and Written Opinion dated May 19, 2014.
"Bolthouse Farms Protein Plus" downloaded from http://smellslikefoodinhere.blogspot.com/2011_07_01_archive.html, dated Jul. 31, 2011, 3pages.
Non-Final Office Action issued in related parent U.S. Appl. No. 14/164,466 dated Jul. 7, 2014.

* cited by examiner

*Primary Examiner* — Chhaya Sayala
(74) *Attorney, Agent, or Firm* — Wilson, Sonsini, Goodrich & Rosati

(57) ABSTRACT

An alkaline sports drink that utilizes phosphate buffer to achieve a pH of 7.4(+/−0.3) for the purpose of preventing dental caries, improving physical performance, and benefiting overall health, is disclosed. This beverage product is stable at an alkaline pH, which is beneficial for oral health and the use of phosphate buffer increases physical performance by increasing muscle oxygen availability. The product is beneficial to overall health by buffering harmful acidic metabolites and aiding in their excretion from the body.

2 Claims, No Drawings

ALKALINE COMPOSITIONS

CROSS-REFERENCE

This application is a continuation of U.S. patent application Ser. No. 14/164,466, filed on Jan. 27, 2014, which claims priority to U.S. Provisional Patent Application 61/733,729, filed Dec. 5, 2012, both of which are incorporated herein by reference in their entireties.

BACKGROUND OF THE INVENTION

Problem Solved

Prevents dental caries disease. Improves oxygen delivery in body. Buffers acidic metabolites. This patent is for the use of a phosphate buffering system to achieve a beverage pH of 7.4 (+/−0.3).

Other sports drinks are acidic. The consumption of acidic beverages (below pH 5.5) demineralizes the teeth leading to dental caries. The acidic beverages also contribute to increased dietary acid load, causing increased physical fatigue, and negatively affecting overall health.

This beverage product is stable at an alkaline pH of 7.4 (+/−0.3), which is beneficial for oral health and the use of phosphate buffer increases physical performance by increasing oxygen delivery to tissues and buffering acidic metabolites.

DETAILED DESCRIPTION OF THE INVENTION

As stated above, the beverage prevents dental caries disease, improves oxygen delivery in body, and buffers acidic metabolites. The invention claimed here solves these problems associated with sports drinks.

This beverage is alkaline, utilizing dipotassium phosphate buffer to achieve a stable alkaline state of pH 7.4 (+/−0.3). The alkalinity prevents tooth demineralization and promotes healthy oral micro flora, decreasing dental caries disease. The use of dipotassium phosphate to stabilize the beverage at an alkaline pH causes alkalizing effects on the blood, acting on hemoglobin and allowing for increased oxygen delivery to tissues. The alkalinity in combination with high potassium concentration causes increased bicarbonate secretion into the blood by parietal cells in the wall of the stomach. This causes neutralization and excretion of harmful acidic metabolites in the blood. The high phosphate concentration acts as a urinary buffer, allowing for increased acid excretion via the urinary system and long term control of acid imbalance (which is detrimental to physical performance and overall systemic health).

The claimed invention differs from those that currently exist. This is the first sports drink that is alkaline rather than acidic, preventing the oral and systemic problems that occur with acidic beverage consumption. This beverage also utilizes a phosphate buffering system to naturally increase the energy producing ability of cells and allow for more oxygen delivery to peripheral tissues.

This invention is an improvement on what currently exists. This is the first sports drink that is alkaline rather than acidic, preventing the oral and systemic problems that occur with acidic beverage consumption. This beverage also utilizes a phosphate buffering system shown to naturally increase 2, 3 Bisphosphoglycerate in the blood and allow for more oxygen delivery to peripheral tissues.

Acids contacting the teeth directly demineralize the teeth leading to cavity formation. Acidic beverages increase dietary acid load, leading to decreased physical performance and systemic health complications.

This beverage product is stable at an alkaline pH of 7.4 (+/−0.3), which is beneficial for oral health and the specific use of phosphate buffer increases physical performance.

The Version of the Invention Discussed Here Includes:
1. Dipotassium phosphate
2. aloe vera juice
3. agave nectar
4. magnesium chloride
5. ascorbic acid
6. natural flavors Relationship Between the Components:

The dipotassium phosphate (1) acts as the buffering agent, allowing for an alkaline pH of 7.4 (+/−0.3). The Aloe Vera juice (2) acts as a source of nutrients necessary for optimal health and performance. The agave nectar (3) is the source of carbohydrate for optimal sustained energy with a low glycemic index. The magnesium chloride (4) is for fortification of magnesium for increased nutrient absorption and proper cell function. The ascorbic acid (5) is for added antioxidant and increased immune function. The natural flavors (6) are for flavor profile.

How the Invention Works:

The use of a phosphate buffer system to achieve a stable pH of 7.4 (+/−0.3), in context of a sports drink is unique. The buffer system at pH 7.4 (+/−0.3) raises the oral pH and promotes tooth remineralization. The digestion of dipotassium phosphate in this form occurs in the stomach and small intestine. In the stomach, potassium is actively absorbed by the potassium/hydrogen exchange mechanism, producing bicarbonate ion and causing an "alkaline tide" and beneficial alkalization of the blood system (offsetting dietary and metabolic acidosis). The absorption of phosphate in the small intestine allows for increased 2, 3 bisphosphoglycerate in the blood and decreases oxygen affinity to hemoglobin. This allows for increased oxygen delivery to peripheral tissues and increased physical performance.

How to Make the Invention:

Mix ingredients with purified water in sterile environment, then process through sterilization unit and bottle in aseptic facility.

Phosphate is necessary for achieving a stable pH of 7.4 (+/−0.3). The aloe vera, agave nectar, magnesium chloride, and natural flavors are optional and variable.

Any ingredient may be manipulated in concentration to achieve a similar function. An additional ingredient may be added or a non-essential ingredient may be removed or altered. The phosphate buffer can be modified in concentration, or grouped with another acid or base to elicit similar functionality at a pH slightly different than the ideal 7.4.

How to Use the Invention:

For use of this beverage, consume on a regular basis with increased consumption in days leading up to physical performance event. Ideal dosage is 1 to 2 bottles per day regularly, with up to 4 bottles per day within 5 days of an event. Effects can be seen however by replacing any beverage with this product. In this case, customer should drink desired amount (serving size 8 oz) before and during exercise, or at any time for general hydration.

The invention claimed is:
1. An alkaline beverage composition consisting of:
   a. dipotassium phosphate;
   b. aloe vera extract;
   c. agave nectar;
   d. magnesium chloride;
   e. ascorbic acid;

f. at least one flavoring; and
g. water, wherein the composition has a pH between about 7.1 to about 7.7.

2. The composition of claim 1, wherein the composition has a pH of about 7.4.

\* \* \* \* \*